United States Patent [19]

Ruff

[11] Patent Number: 5,212,957
[45] Date of Patent: May 25, 1993

[54] REFGRIGERATOR/WATER PURIFIER
[75] Inventor: John D. Ruff, Alexandria, Va.
[73] Assignee: Thermadyne, Inc., Alexandria, Va.
[21] Appl. No.: 864,781
[22] Filed: Apr. 7, 1992

Related U.S. Application Data

[60] Continuation-in-part of Ser. No. 654,509, Feb. 13, 1991, Pat. No. 5,123,948, which is a continuation-in-part of Ser. No. 494,546, Mar. 16, 1990, Pat. No. 4,998,417, which is a continuation-in-part of Ser. No. 437,161, Nov. 16, 1989, Pat. No. 4,944,902, which is a division of Ser. No. 278,447, Dec. 1, 1988, Pat. No. 4,897,099.

[51] Int. Cl.$^5$ .............................................. C02F 1/22
[52] U.S. Cl. ........................................ 62/124; 62/137
[58] Field of Search ................... 62/123, 124, 532, 137

[56] References Cited

U.S. PATENT DOCUMENTS

| | | | |
|---|---|---|---|
| 3,390,718 | 7/1968 | Gelbard | 62/137 X |
| 3,675,437 | 7/1972 | Linstromberg | 62/137 |
| 3,714,794 | 2/1973 | Linstromberg et al. | 62/137 |
| 3,788,089 | 1/1974 | Graves | 62/137 |
| 3,964,269 | 6/1976 | Linstromberg | 62/137 |
| 4,897,099 | 1/1990 | Ruff | 62/532 |

Primary Examiner—William E. Tapoicai

[57] ABSTRACT

A refrigeration system provides a supply of purified ice pieces by freezing flowing water on an icemaking plate and melting some of the ice pieces to provide a supply of purified water. The system is combined with a household refrigerator to utilize a common compressor and condenser. Alternative arrangements are provided for a single speed compressor or a two speed compressor to adapt to varying load requirements. The ice storage bin may be disposed in the refrigerator section where ice melting takes place continually, or in the freezer section where ice only melts on demand from a sensing of purified water quantity.

13 Claims, 5 Drawing Sheets

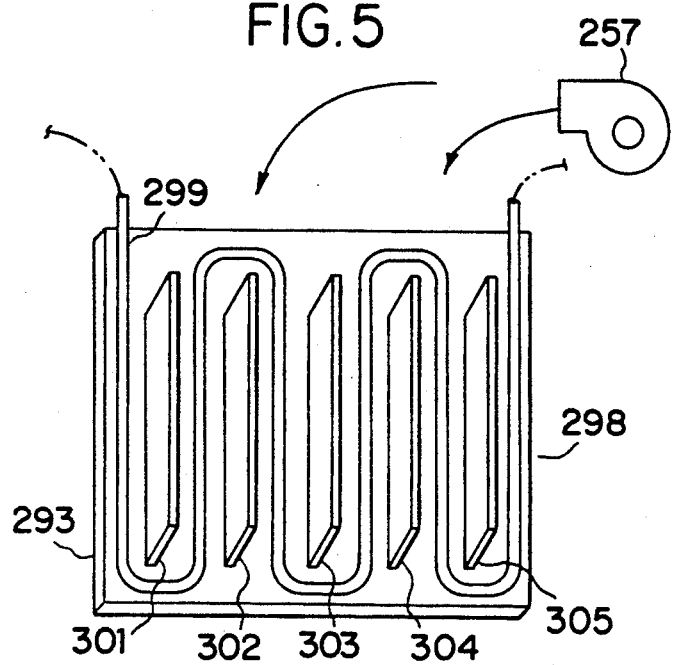
FIG.5
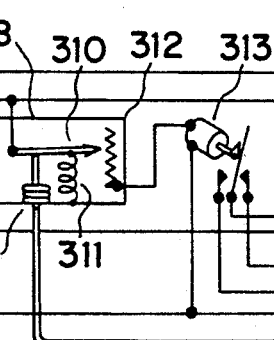
FIG.6
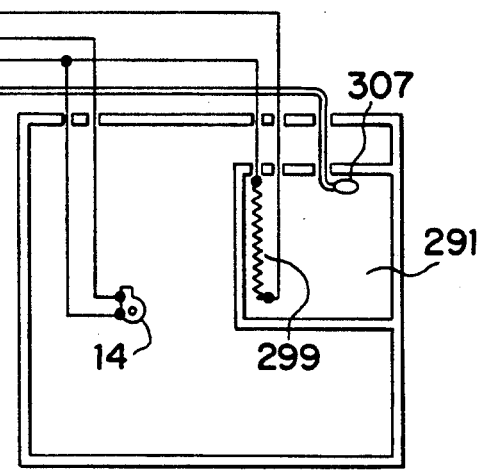

REFGRIGERATOR/WATER PURIFIER

CROSS-REFERENCE TO RELATED APPLICATIONS

This application is a continuation-in-part of my co-pending U.S. patent application Ser. No. 07/654,509 filed Feb. 13, 1991, now U.S. Pat. No. 5,123,948, which is a continuation-in-part of my prior U.S. patent application Ser. No. 07/494,546, filed Mar. 16, 1990, now U.S. Pat. No. 4,998,417. Application Ser. No. 07/494,546 is, in turn, a continuation-in-part of my co-pending U.S. patent application Ser. No. 07/437,161 filed Nov. 16, 1989, now U.S. Pat. No. 4,941,902, which is a divisional application of my U.S. patent application Ser. No. 07/278,447, filed Dec. 1, 1988, now U.S. Pat. No. 4,897,099.

The subject matter of all of these aforesaid applications is expressly incorporated herein in its entirety.

BACKGROUND OF THE INVENTION

The present invention relates to a method and apparatus for providing purified ice pieces and purified liquid water from a source of unpurified liquid water, and the incorporation of such method and apparatus into a domestic refrigerator, while using the same compressor, condenser and insulated cabinet for both the icemaker/water purifier system and the domestic refrigerator.

In my U.S. Pat. No. 4,897,099 I disclose a method and apparatus for forming purified ice pieces from unpurified water such as tap water. The ice pieces are periodically harvested and collected in a bin, the bottom of which is heated as necessary to melt desired quantities of the ice to provide a supply of purified water. In the embodiment disclosure in FIG. 1 of my aforementioned patent, the compressor is deactivated whenever the ice bin is full and the purified water container is full.

In the present invention, the compressor is not necessarily deactivated when the ice bin is full. Since separate evaporator sections are used for icemaking and refrigeration, the icemaking evaporator section can be deactivated while the compressor continues to run, thus providing cooling from the still activated refrigeration evaporator section should it be required.

OBJECTS AND SUMMARY OF THE INVENTION

It is the object of the present invention to combine the functions of an icemaker/water purifier and domestic refrigerator into a single unit. This is desirable since the preferred location in a home for an icemaker/water purifier is in the kitchen, but floorspace is not always available in the kitchen for an additional appliance. A further advantage is gained in the initial lower cost of the appliances. Since some components are shared by both appliances, the overall cost of the combined refrigerator and icemaker/water purifier unit is considerably less than the cost of individual units.

Since the cooling capacity required with the icemaking function and refrigeration function operating simultaneously is considerably greater than when either function is operating singly, a two-speed compressor can be used to provide more efficient operation.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference numerals, and wherein:

FIG. 5 is a rear view in perspective of a finned heat conductor block employed in the system of FIG. 4; and FIG. 6 is an electrical schematic diagram of a variable timer circuit that may be utilized in the embodiment of FIG. 4.

DESCRIPTION OF THE PREFERRED EMBODIMENTS

Figure 1:
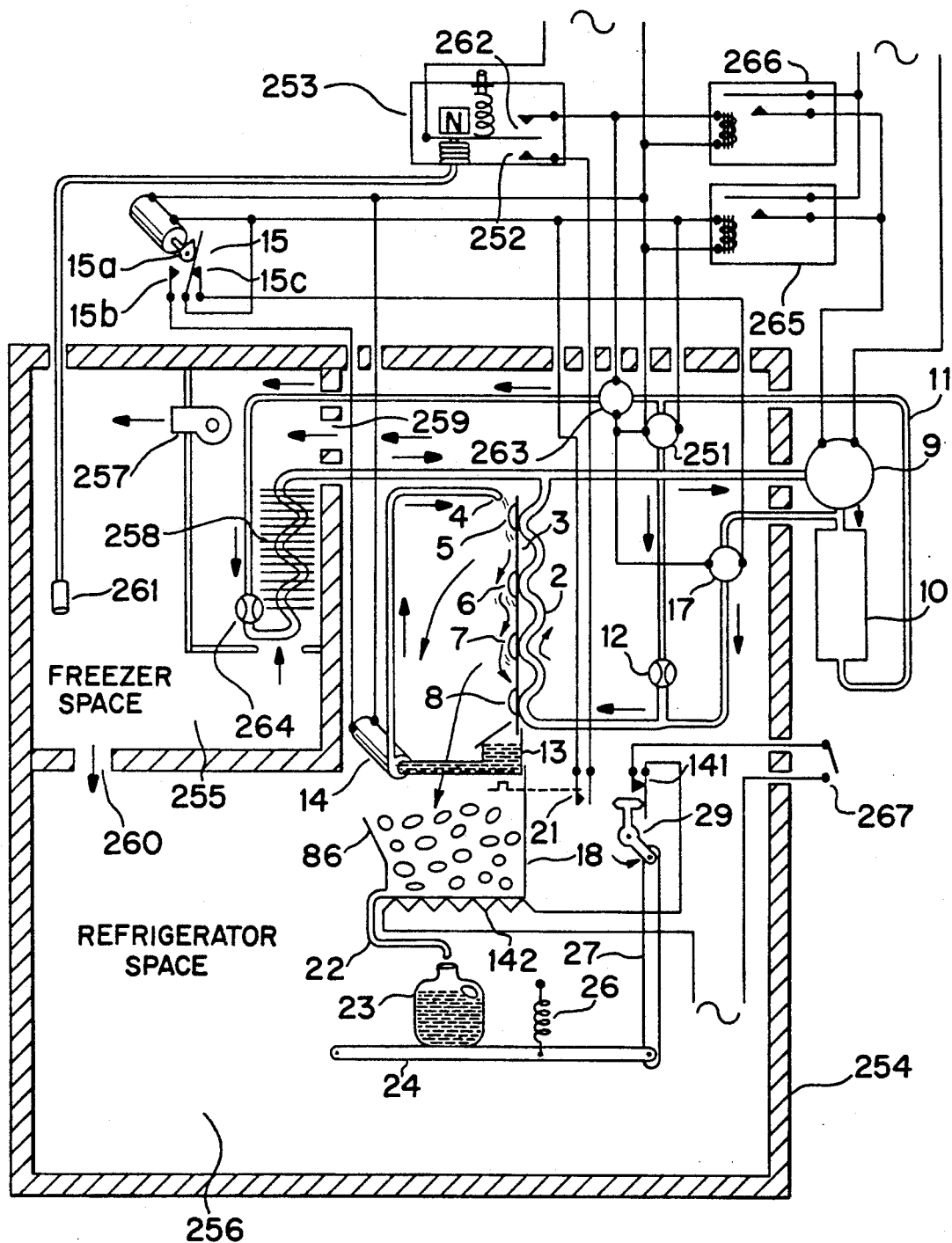
FIG. 1 is a schematic flow diagram of a system constituting one embodiment of the present invention.

In order to facilitate reference to the disclosure material incorporated herein from my U.S. Pat. No. 4,897,099 and my other above-described patent applications and issued patents, reference numerals up to and including 250 appearing in the accompanying drawings are chosen to correspond to those reference numerals employed in the aforesaid patents for like elements. Higher reference numerals appearing in the accompanying drawings designate elements not present in the aforesaid patents. In the interest of brevity, and to facilitate understanding of the subject matter of the present invention, the following description omits discussion of the portions of the system not directly related to the invention subject matter.

Referring to FIG. 1 of the accompanying drawings, an ice maker includes an evaporator 2 contacting the dry or control surface of a vertical ice-forming plate 3 at multiple spaced points. For some applications a plurality of such plates may be employed. Unpurified water discharged as a jet or stream from nozzle 4 flows down the wet or ice-forming surface of plate 3, whereby ice pieces 5, 6, 7 and 8 are formed at spaced areas corresponding to the locations of contact between evaporator 2 and plate 3. Refrigerant vapor from the evaporator flows back to a compressor 9 where it is compressed and then flows to condenser 10. Condensed liquid refrigerant flows via liquid line 11 through liquid line solenoid valve 251 which is energized by current flowing through the closed contacts 252 of thermostat 253 and bin switch 21. The liquid then flows through metering device 12, typically an expansion valve, then back to evaporator 2 in a conventional closed circuit refrigeration flow path. Excess water flowing over the growing ice pieces 5, 6, 7 and 8 carries away impurities before they can be trapped and then drains into sump 13. Water from sump 13 is drawn by pump 14 and pumped back to nozzle 4 to form a continuous circuit of unpurified water flow.

After a predetermined time has elapsed for ice piece 5, 6, 7 and 8 to grow to adequate size, a harvest of ice pieces is initiated. A cam 15a of a timer 15 actuates switch points 15b to break an energizing circuit for pump 14. With pump 14 deactuated, water in transit from pump 14 to nozzle 4, and water flowing over the ice pieces, flows back to raise the level in sump 13. This activates a siphon which then dumps the remainder of the water from sump 13 to the drain. At the same time, timer 15 activates switch point 15b to deactivate pump 14, and activates switch point 15c to energize a hot gas valve 17, allowing hot refrigerant gas to be shunted around the condenser and expansion valve and flow directly into evaporator 2. The warming effect of this hot gas detaches the ice pieces from plate 3 permitting the pieces to fall into ice bin 18. Meanwhile, the water in sump 13 is replenished by tap water under the control of a float valve. After a predetermined ice piece harvest interval, cam 15a of timer 15 reverses the settings of the switch points, de-energizes hot gas valve 17, and reactivates pump 14 so that ice making can be resumed. A repetitive cycle of harvest and ice making is thus continued until ice bin 18 is full, at which time the ice pieces come into contact with the ice quantity sensor of bin switch 21 which opens, causing solenoid valve 251 to be de-actuated and ice making terminated. The ice pieces thusly collected, because they are continuously washed by the stream evacuating from nozzle 4 as they are being formed, have a much higher purity than that of the original tap water. The ice-making apparatus so far described is of a type commonly used, well known and described in detail in my above-referenced earlier patent applications. Similarly, any other type of icemaker using a recirculating flow of pumped water, and thus being capable of producing a supply of pure ice pieces, can be used in this invention.

When supplies of solid ice pieces are required they can be removed from ice bin 18 via door 86, or a state of the art motorized ice crusher/dispenser can be used.

Any ice that melts in bin 18 drains through pipe 22 to bottle 23 resting on platform 24, thus providing a supply of purified water. When bottle 23 is less than full, its weight is overcome by the force of balance spring 26 which pulls platform 24 upwards, causing control link 27 to rotate rocker arm 29 and allowing switch 141 to close. Current flowing through switch 141 energizes electrical heating element 142 to heat the bottom of bin 18, causing ice therein to melt. When the purified water derived by melting ice has filled bottle 23 to a predetermined level, its increased weight overcomes the force of balance spring 26, allowing platform 24 and control link 27 to drop and rocker arm 29 to open switch 141, thus de-energizing heating element 142. This above described ice-melting function is described in greater detail in my above-described patent applications. Additionally, any of the other methods of ice-melting described in earlier patents can be used in the present invention. These methods include heating by air flow and the use of rejected condenser heat. As described in my earlier patents, a tank with a float switch can be used to hold the purified water and determine it's quantity instead of the arrangement with bottle 23, platform 24, balance spring 26 and switch 141.

The combined refrigerator and icemaker/water purifier unit is enclosed in an insulated cabinet 254, shown with a separate freezer space 255 and refrigerator space 256. The water sump, pump, icemaker evaporator, ice bin and purified water container of the icemaker/water purifier described above are located in refrigerator space 256, also used for storage of food at temperatures above freezing. Evaporator fan 257 circulates air over refrigerator evaporator 258 in freezer space 255, with a secondary flow of air being induced through openings 259 and 260 to the higher temperature refrigerator space 256. This arrangement is commonly used in existing refrigerators.

Thermostat 253 is shown with remote sensor bulb 261 located in freezer space 255 in the manner commonly employed with domestic refrigerators using temperature settings consistent with maintaining freezer temperatures. Bulb 261 could alternately be located in the refrigerator space 256 with correspondingly higher temperature settings. A variation of this invention would be a refrigerator without a freezer.

In the icemaking function described above, thermostat 253 is described with contacts 252 in the closed position. This occurs when the temperature at bulb 261 is less than the temperature setting of thermostat 253, and no cooling of the refrigerator/freezer is required. This condition leaves the icemaker free to operate under the control of bin switch 21. Also at this time, contacts 262 are open, de-energizing liquid line solenoid 263 and thus preventing refrigerant liquid flowing to refrigerator evaporator 258.

When the temperature at bulb 261 rises above the temperature set point of thermostat 253, a need for cooling of the refrigerator/freezer is indicated, and this is given priority over icemaker operation. Contacts 252 open, shutting down the icemaker by de-energizing liquid line solenoid 251, timer 15 and water pump 14. Contacts 262 close, energizing liquid line solenoid 263 to allow refrigerant liquid flow through metering device 264 to refrigerator evaporator 258, wherein evaporation and cooling occur. Refrigerant vapor from evaporator 258 flows back to compressor 9. Icemaker evaporator 2 and refrigerator evaporator 258 are, in effect, parallel connected evaporators with a common suction line and with selective liquid line flow control.

Compressor 9 is energized through the parallel connected contacts of relays 265 and 266. Relay 265 is activated in icemaker operation, and relay 266 is activated in refrigerator operation. In either operation the compressor is energized; but when neither operation is in progress the compressor is de-energized.

Because bin 18 is located in a space whose temperature is above freezing, some melting of ice will occur at all times, regardless of whether heating element 142 is energized. This results in some overflowing of bottle 23. Remedies for this are included in one of my referenced earlier patents. Additionally, insulating of the outer surface of bin 18 helps to reduce this overflow. Some advantage can be taken of the continuous melting by the use of manually operated interrupter switch 267 as an economy measure. When switch 267 is open, heating element 142 cannot be energized, but the above-mentioned slow melting continues. In some applications this is satisfactory. Such a situation occurs with this slow melting proceeding all night and providing enough purified water for the next day's use. Then, at such times when the purified water supply runs low, switch 267 can be closed and the higher melting rate achieved. An alternate arrangement is a system in which heating element 142 is not used.

Figure 2:
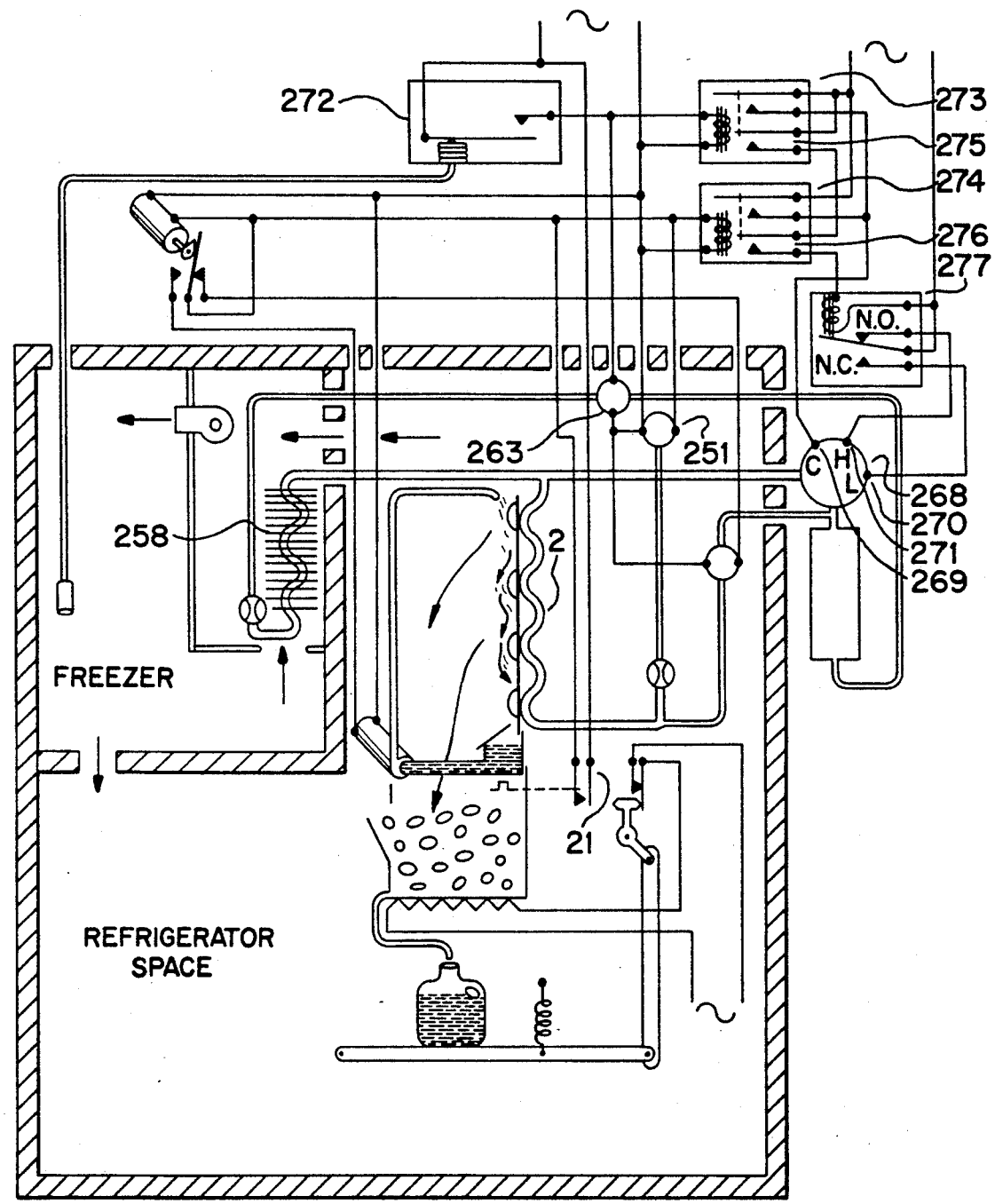
FIG. 2 is a schematic flow diagram of an alternative embodiment of the invention employing a two-speed compressor.

The embodiment shown in FIG. 2 is similar to the embodiment of FIG. 1 except that by the use of a two-speed compressor, both the icemaking and refrigeration functions can be performed simultaneously or separately, as conditions demand. Two-speed compressor 268 is sized so that when energized through common connection 269 and low-speed connection 270, it has capacity to match the operation of either icemaker evaporator 2 or refrigerator evaporator 258 when operating separately with either evaporator. When energized through common connection 269, and high-speed connection 271, compressor 26 has double capacity so that both evaporators can operate simultaneously. Single pole thermostat 272 has direct control over liquid line solenoid valve 263 for refrigerator evaporator operation, and bin switch 21 has direct control of liquid line solenoid valve 251 for icemaker evaporator operation. Two pole relays 273 and 274 are energized in the refrigerator evaporator and the icemaker evaporator operations, respectively. Contacts 275 and 276 are connected in series so that when both relays 273 and 274 are energized, current flows to energize relay 277. When relay 277 is energized it's normally open contacts close, allowing current to flow to high-speed connection 271 of compressor 268. In this manner high-speed operation of compressor 268 is achieved when both refrigeration and icemaker evaporators are functioning.

If either one of the refrigerator or icemaker evaporator functions is discontinued, either relay 273 or relay 274 is de-energized. Then the series current flow through contacts 275 and 276 is interrupted, and relay 277 de-energized. When relay 277 is de-energized it's normally closed contacts close, allowing current to switch flow to low-speed connection 270 of compressor 268, and low speed operation is thus achieved.

Relays 273 and 274 additionally have parallel connected contacts employed in the same manner as with relays 265 and 266 in FIG. 1, so that when both refrigerator and icemaker evaporator functions are discontinued, current flow to common connection 269 of compressor 268 is interrupted, and the compressor shuts down.

Figure 3:
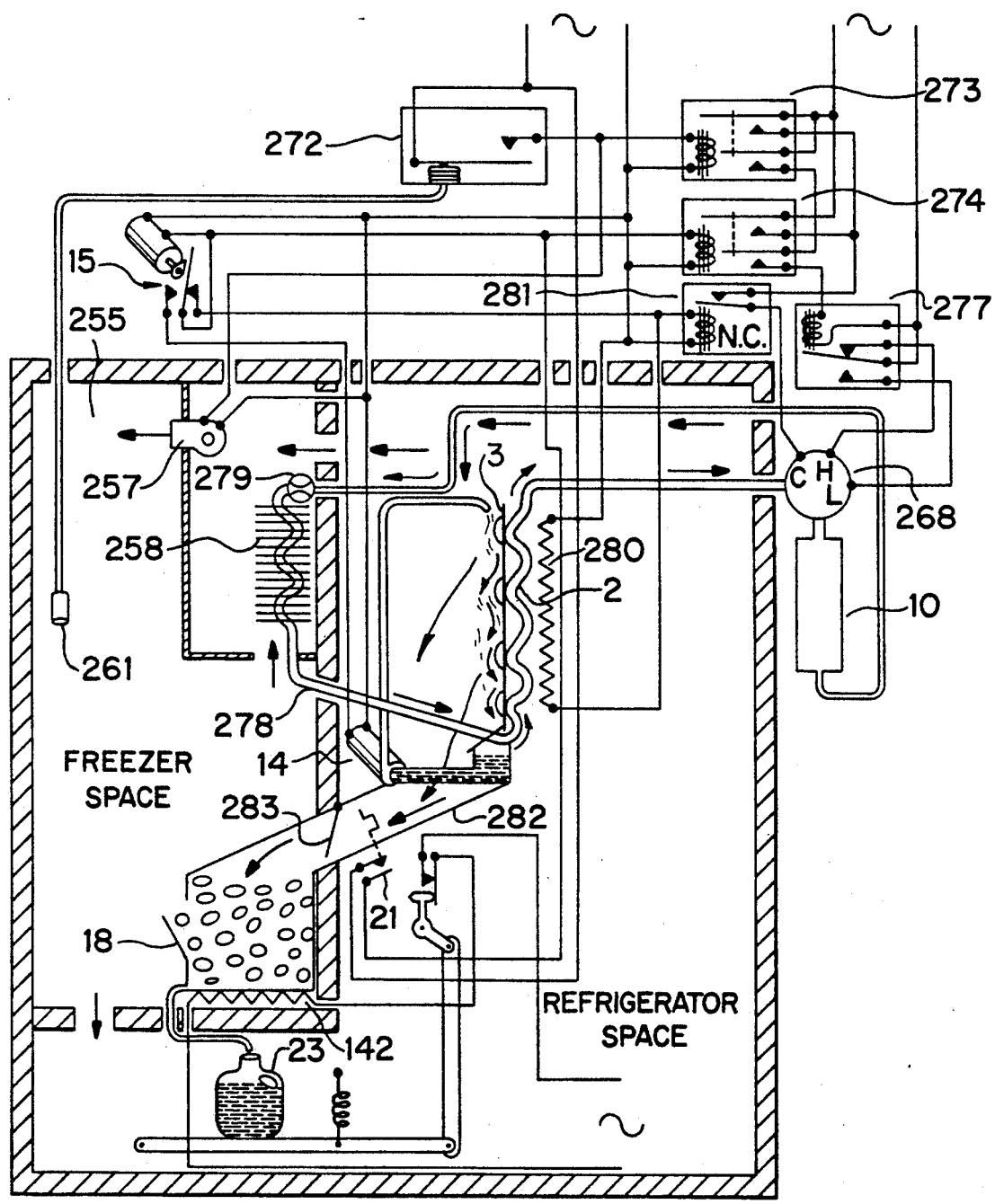
FIG. 3 is a schematic flow diagram of another alternative embodiment of the invention employing series connected flow evaporator coils and an ice bin located in the freezer compartment.

The embodiment illustrated in FIG. 3 provides an alternative arrangement of refrigerant flow through icemaker evaporator 2 and refrigerator evaporator 258. Whereas in the embodiments of FIG. 1 and FIG. 2 a parallel connection of these evaporators is employed, this present embodiment employs a series connection. Instead of using separate liquid line solenoid valves to select between icemaking and refrigerator evaporator refrigerant flows, a constant, series flow continues through both evaporators all the time that the compressor is functioning. Selective independent control to discontinue the effective function of the icemaker evaporator is achieved by interrupting current flow to water pump 14, under the control of bin switch 21, through the contacts of timer 15, when ice bin 18 is full. With pump 14 stopped, water flow over plate 3 ceases and the heat load on evaporator 2 is reduced to a negligible amount since the only heat exchange then available is from the evaporator to still air. Selective independent control to discontinue the effective function of refrigerator evaporator 258 is achieved by interrupting current flow to evaporator fan 257, under the control of thermostat 272, when the temperature in freezer space drops to a predetermined level. With evaporator fan 257 stopped, still air surrounds evaporator 258 and the resulting poor heat exchanging reduces the heat load on evaporator 258 to a negligible amount. With the heat load so reduced, and assuming an ongoing icemaker function, little evaporation of refrigerant occurs in evaporator 258. So, with a small vapor flow through the evaporator, there is a tendency to accumulate liquid in this evaporator. For this reason the coils of evaporator 258 and the connecting line 278 to evaporator 2 are pitched downward to promote drainage of liquid refrigerant and oil. Metering device 279 controls flow of refrigerant liquid to the series evaporator system.

Condenser 10 is used in the same manner as described in the embodiments of FIG. 1 and FIG. 2. Two-speed compressor 268, controlled by relay 273, relay 274, relay 277, thermostat 272, and bin switch 21, is employed in the same manner as shown in the embodiment of FIG. 2; so that simultaneous functioning of the refrigerator evaporator and the icemaker evaporator can be employed.

Alternatively, a single speed compressor can be used with the present series connected evaporators in the manner shown with the embodiment of FIG. 1. Because of the peculiarities of the present series connected arrangement, the hot gas defrost harvest method shown in FIG. 1 and FIG. 2 is not used. The same timer 15 is used, but a electric heating element 280 is energized to heat evaporator coil 2, to harvest the ice pieces.

At the same time element 280 is energized, relay 281 is energized. Normally closed contacts of relay 281 open to de-actuate compressor 268 during this harvest function.

An alternative arrangement illustrated in FIG. 3 is the placement of ice bin 18 and heating element 142 within freezer compartment or space 255. During the harvesting of ice pieces, ice falling from plate 3 is conveyed by chute 282, through flap door 283 to bin 18. Flap door 283 free-hangs in a closed position to keep cold freezer air from escaping, but is forced open by the weight of falling ice pieces. Bin switch 21 is mounted inside chute 282 so that it is activated when bin 18 is full and ice backs up in chute 282. The placement of the ice bin within the freezer space prevents the continuous melting of ice pieces as occurs in ice bins placed in the refrigerator space, and also prevents unwanted overflowing of bottle 23. Melting only occurs when heating element 142 is energized. This placement of bin 18 in the freezer space can also be employed in the embodiments illustrated in FIG. 1 and FIG. 2, and can employ any of the other ice melting methods shown in my earlier referenced patents, such as the application of heat derived from room ambient air, or heat rejected from the system condenser. Also melting can be accomplished by the methods associated with the use of room ambient air, but using cool air from the refrigerator space 256 instead of room ambient air.

The embodiment of FIG. 3, using series connected evaporator sections, can also be used with ice bin 18 located in the refrigerator space in the manner illustrated in FIGS. 1 and 2.

Figure 4:
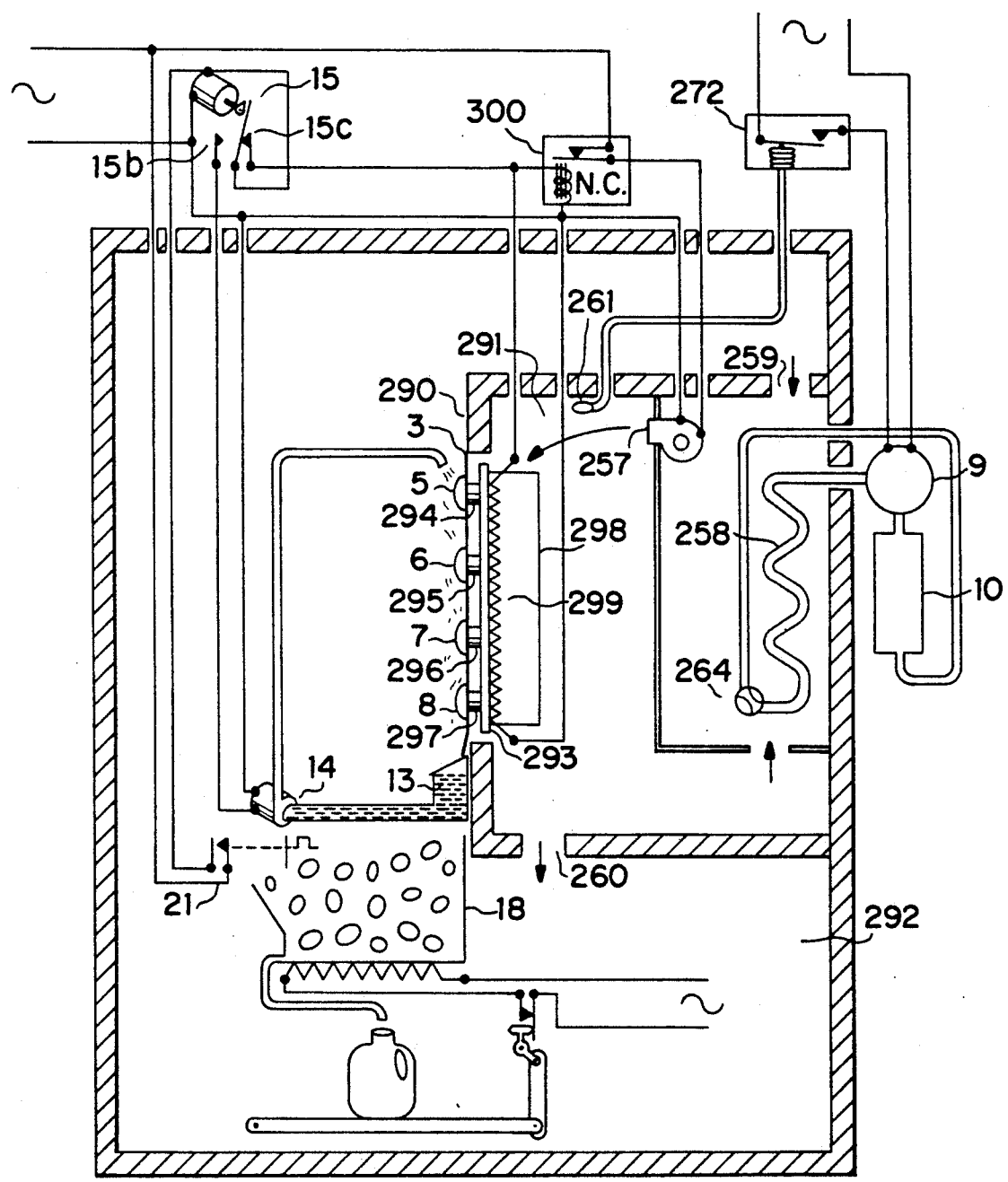
FIG. 4 is a schematic flow diagram of an alternative embodiment of the invention wherein ice forming is effected utilizing the sub-freezing air in the refrigerator freezer compartment.

The embodiment illustrated in FIG. 4 provides an alternative method of cooling ice-forming plate 3. Plate 3 forms part of the dividing wall 290 separating freezer space 291 and refrigerator space 292, so that one side of plate 3 is contacted by sub-freezing air in freezer space 291 and the other side, described as the wet or ice-forming surface, is contacted by the warmer air of refrigerator space 292. Instead of using the direct application of cooling by evaporator 2 to plate 3 as in above-described embodiments, the present embodiment utilizes the cooling effect of the sub-freezing air in freezer space 291 in the icemaking process. Finned heat conductor block 293 has protruding extensions 294, 295, 296 and 297 in contact with plate 3 at locations corresponding to ice pieces 5, 6, 7 and 8. Heat removed during formation of these ice pieces flows through the body of block 293 to fin assembly 298, to be absorbed by the flow of cold air propelled through it by fan 257. In operation, compressor 9, condenser 10, metering device 264, evaporator 258 and fan 257 function to cool the air in freezer space 291 in the manner already described in relation to the embodiment of FIG. 1. Thermostat 272, with a remote bulb 261, maintains a predetermined temperature in freezer space 291 by cycling compressor 9. Water pump 14 draws unpurified water from sump 13 and pumps it to flow over plate 3 to build up ice pieces for a period of time controlled by timer 15, as in the manner of FIG. 1 embodiment. In the present embodiment, icemaking is independent of compressor function and can proceed when the compressor is cycled off. When timer 15, by the opening of contacts 15b, deactivates pump 14 to the icemaking cycle, it also closes contacts 15c, activating heating element 299, to heat conductor block 293, which conducts heat to plate 3 at the locations of the formed ice pieces. This heat detaches the ice pieces, causing them to fall into bin 18 in a harvest cycle. At the same time that heating element 299 is energized, relay 300 is energized, and its normally closed contacts open to cause fan 257 to be deactivated during the harvest cycle. This prevents the heating effect of element 299 from being opposed by a continuing flow of cold air through fin assembly 298. At the start of the harvest cycle the remaining unpurified water in sump 13 is dumped to a drain, and sump 13 is replenished with a fresh supply of unpurified water, in the manner already described in relation to the embodiment of FIG. 1.

When the level of ice in bin 18 reaches bin switch 21, the switch opens and interrupts current flow to timer 15, thereby preventing any further current flowing to heating element 299 or pump 13. With pump 13 thus remaining deactivated, water flow over plate 3 ceases and icemaking is stopped. Plate 3 remains at the subfreezing temperature of freezer space 291 and does tend to have a cooling effect on refrigerator space 292, but since the exposed ice forming surface is of limited area and lacking an induced airflow, the amount of heat exchange is limited. To compensate for this cooling effect, the size of openings 259 and 260, used to distribute cold air to the refrigerator space, is reduced.

The ice collected in bin 18 is either used directly or melted to provide purified water by any of the methods already described in the embodiments of FIG. 1, FIG. 2 or FIG. 3.

FIG. 5 is a rear view of fin assembly 298 and heat conductor block 293. Fins 301, 302, 303, 304 and 305 are contacted by a flow of cold air from fan 257. Heating element 299, typically a metal sheathed heater, lies adjacent the rear surface of block 293 to heat the block during ice piece harvest. Essentially, fin assembly 298 and heat conductor block 293 comprise a means of conducting heat efficiently, by a substantial metal conductor, from multiple spaced points on plate 3 to the cold airstream in freezer space 291. The fins are used to present a large surface area of contact between the metallic conductor and the airstream. Any other type of heat exchange structure performing that same function can be used. An alternate method of providing heat to heat conductor block 293 during ice piece harvest, instead of using heating element 299, is by the use of a hot as bypass through a refrigerant tubing placed in a similar location to element 299. A hot gas solenoid valve may be energized to open during harvest to allow hot gas from the compressor discharge outlet to flow through this tube into the evaporator. The compressor can be made to run continuously during this harvest method.

FIG. 6 shows an embodiment with a variable timer 306 constituting a refinement of timer 15 in FIG. 4. In all other ways the embodiment of FIG. 6 is the same as the embodiment of FIG. 4. In operation, due to frequent refrigerator or freezer door openings or other reasons, the temperature in freezer space 291 may not be at an ideal low level. In such situations the build-up of ice pieces is not as fast as normal, and if a fixed time timer, such as timer 15 in FIG. 4, is used, the ice pieces are not fully sized. Variable timer 306 has a sensor bulb 307 which senses the temperature in freezer space 291 and varies the icemaking time to allow for variations in freezer temperature. A higher than normal temperature thus causes a longer icemaking time. Such temperature dependent timers are conventional in electronic control equipment, but a more basic arrangement is shown with controller 308.

In operation, a higher temperature at gas-filled bulb 307 causes connected gas filled bellows 309 to move wiper arm 310 against pressure from control spring 311 to slide against resistor 312 to a new point of contact, thus engaging a larger portion of resistor 312 in series between incoming voltage and motor 313. This increase in electrical resistance causes motor 313 to run at a slower speed and results in a longer icemaking time.

Having described preferred embodiments of a new and improved household refrigerator with combination icemaker and water purifier constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined in the appended claims.

What is claimed is:

1. A system for storage of foodstuffs at temperatures less than 45° F., and for providing ice and purified water comprising:

a continuous refrigerant flow path including a compressor, a condenser, a metering means and an evaporator means;

a storage space for food;

means for cooling said storage space by conducting thermal energy from said storage space to said evaporator means;

temperature sensor means for sensing the temperature in said storage space;

control means responsive to said temperature sensor means for energizing said compressor when the temperature in said storage space is higher than a predetermined level;

at least one ice-forming surface;

means for cooling selected areas of said ice-forming surface to a temperature below the freezing temperature of water by conducting thermal energy to said evaporator means from said selected areas;

pump means for circulating a stream of unpurified water over said selected areas to form ice at said selected areas while washing impurities away from the formed ice with said stream;

means for increasing the temperature at said selected areas at various times to remove said ice from said ice-forming surface;

a bin for collecting ice removed from said ice-forming surface;

means for warming said bin to melt some of the ice collected therein into purified liquid water;

container means for collecting the purified liquid water formed by melting the ice in said bin;

bin sensor means for sensing the amount of ice collected in said bin;

container sensor means for sensing the amount of purified liquid water collected in said container; and control means responsive to said bin sensor means for deactivating said pump means when said amount of said collected ice in said bin exceeds a predetermined amount.

2. The system according to claim 1 wherein said evaporator means includes first and second selectively reducible capacity evaporator sections corresponding to said evaporator means, wherein said first evaporator section is employed as part of said means for cooling said storage space, and wherein said second evaporator section is employed as part of said means for cooling selected areas of ice-forming surfaces;

control means responsive to said temperature sensor means for reducing the capacity of said first evaporator section in response to the temperature in said storage space being less than a predetermined level;

control means responsive to said bin sensor means for reducing the capacity of said second evaporator section when the amount of said collected ice in said bin exceeds a predetermined amount; and control means responsive to both said temperature sensor means and said bin sensor for de-energizing said compressor when the temperature in said storage space is less than a predetermined level and the amount of said collected ice in said bin exceeds a predetermined amount, said control means further including means for re-energizing said compressor in response to either or both of the following conditions: (1) the temperature in the said storage space exceeds a predetermined level; and (2) the amount of said collected ice in the said bin falling below a predetermined amount.

3. The system according to claim 1 wherein said means for warming said bin includes heating means for selectively heating the bottom of said bin;

control means responsive to the said container sensor means for energizing said heating means when the said amount of said purified water in said container is less than a predetermined amount;

control means responsive to the said container sensor means for de-energizing said heating means when the said amount of said purified water in said container exceeds a predetermined amount.

4. The system according to claim 2 wherein said first evaporator section includes an electrically operated liquid line solenoid valve.

5. The system according to claim 2 wherein said second evaporator section includes an electrically operated liquid line solenoid valve.

6. The system according to claim 2 wherein said first evaporator section includes an evaporator fan and control means responsive to said temperature sensor means for deactivating said evaporator fan when the temperature in said storage space is less than a predetermined level and while said compressor is energized to provide cooling of said selected areas of ice-forming surface.

7. The system according to claim 2 wherein said second evaporator section includes means for conducting thermal energy from said selected areas contacted with a flow of unpurified water propelled by said pump means, and control means responsive to said bin sensor means for deactivating said pump means when the amount of ice in said bin exceeds a predetermined amount while said compressor is energized to provide cooling of said storage space.

8. The system according to claim 1 wherein said storage space is divided into a refrigerator space maintained at a temperature above 32° F., and a freezer space maintained at a temperature below 32° F.

9. The system according to claim 8 wherein said ice-forming surface, said pump means and said container means are located within said refrigerator space, and said bin and said heating means are located in said freezer space.

10. The system according to claim 8 wherein said ice-forming surface, said pump means, said container means, said bin and said heating means are all located in the said refrigerator space.

11. The system according to claim 1 wherein said evaporator means includes an evaporator coil and an evaporator fan for circulating sub-freezing air over said evaporator coil, and wherein said sub-freezing air is used to cool said storage space.

12. The system according to claim 11 further comprising a metal heat exchanger, and wherein said sub-freezing air is circulated over said heat exchanger for cooling said selected areas of said ice-forming surface.

13. The system according to claim 12 further comprising timer means and means for sensing the temperature of said sub-freezing air and controlling said timer means to regulate the time interval of formation of the said ice at the said selected areas.

* * * * *